(12) United States Patent
Lüssi

(10) Patent No.: US 8,444,016 B2
(45) Date of Patent: May 21, 2013

(54) APPARATUS FOR DISPENSING MILK-BASED PRODUCTS

(75) Inventor: André Lüssi, Jegenstorf (CH)

(73) Assignee: Schaerer AG, Zuchwil (CH)

( * ) Notice: Subject to any disclaimer, the term of this patent is extended or adjusted under 35 U.S.C. 154(b) by 632 days.

(21) Appl. No.: 12/667,735

(22) PCT Filed: Jul. 4, 2008

(86) PCT No.: PCT/EP2008/058720
§ 371 (c)(1),
(2), (4) Date: Jan. 5, 2010

(87) PCT Pub. No.: WO2009/004089
PCT Pub. Date: Jan. 8, 2009

(65) Prior Publication Data
US 2010/0187259 A1    Jul. 29, 2010

(30) Foreign Application Priority Data
Jul. 5, 2007    (EP) ..................................... 07111840

(51) Int. Cl.
*B67D 7/74*    (2010.01)
(52) U.S. Cl.
USPC ..................... 222/129.4; 222/132; 222/145.2; 222/145.6; 222/146.1; 222/146.6; 222/148
(58) Field of Classification Search .................. 222/129, 222/129.1, 129.3, 129.4, 145.2, 145.6, 146.6, 222/148
See application file for complete search history.

(56) References Cited

U.S. PATENT DOCUMENTS

| 5,265,520 A * | 11/1993 | Giuliano ........................ 99/323.1 |
| 6,977,091 B2 * | 12/2005 | Carhuff et al. ................ 426/590 |
| 8,181,822 B2 * | 5/2012 | Doelman et al. ................... 222/1 |
| 2006/0249536 A1 * | 11/2006 | Hartman et al. ........... 222/129.3 |
| 2007/0295750 A1 * | 12/2007 | Cocchi et al. .............. 222/145.6 |
| 2009/0293733 A1 * | 12/2009 | Martin et al. ................... 99/280 |

FOREIGN PATENT DOCUMENTS

| EP | 0850586 A1 | 7/1998 |
| EP | 1776904 A1 | 4/2007 |

OTHER PUBLICATIONS

International Search Report dated Aug. 14, 2008.

* cited by examiner

*Primary Examiner* — J. Casimer Jacyna
(74) *Attorney, Agent, or Firm* — Pearne & Gordon LLP

(57) ABSTRACT

An apparatus for dispensing milk-based beverages comprises a milk container (4), a pump (8) for conveying the milk from the milk container (4) to a milk outlet (20), supply means (13, 14) for supplying at least one flavoring agent to the milk and means for mixing the at least one flavoring agent with the milk. To this end, a coolable cabinet (2), into which the milk container (4) can be inserted, is arranged in a housing (1). Via a hose line (7), the milk in the milk container (4) reaches a mixing apparatus (9) in a meterable quantity, conveyed by the pump (8) disposed in the hose line (7). At least one flavoring agent is able to be additionally supplied in a metered manner into the mixing apparatus via the supply means (13, 14), and is able to be mixed with the milk; the mixed beverage thus obtained reaches, via an outlet (20), a vessel (21) which can be provided beneath this outlet (20). Flavored cold milk-based beverages can thereby be produced in an optimal way.

12 Claims, 5 Drawing Sheets

APPARATUS FOR DISPENSING MILK-BASED PRODUCTS

FIELD OF THE INVENTION

Background of the Invention

This invention relates to an apparatus for dispensing milk-based beverages, comprising a milk container, a pump for conveying the milk from the milk container to a milk outlet, supply means for supplying at least one flavoring agent to the milk and means for mixing the at least one flavoring agent with the milk.

Devices for producing cold milk-based beverages with which flavoring agents are mixed are known in diverse designs. Known is, for example, a device in which a vessel filled with cold milk can be kept under a dispenser for flavoring agents, which flavoring agent is then added to the milk, whereby simultaneously a stirring device enters into operation for blending the flavoring agent with the milk. A flavored milk-based beverage can thus be produced in the desired quality; the complexity for producing this milk-based beverage is costly, however.

Beverage vending machines are also known from which flavored milk-based beverages can be obtained in a ready-made way. Hereby used as a base is water, however, with which milk powder is mixed, in addition to the flavoring agents, in order to be able to obtain a milk-based beverage flavored in this way. Such a beverage does not meet higher demands with respect to quality of a milk-based beverage, however.

BRIEF SUMMARY OF THE INVENTION

The object of the present invention thus consists in creating an apparatus for dispensing milk-based beverages which delivers a ready-made flavored milk-based beverage by push button, for example, the quality of which fulfills high expectations, whereby the apparatus should have a simple construction, making the manufacture and maintenance of this apparatus cost-effective.

This object is achieved according to the invention in that the apparatus has a housing, in which a coolable cabinet is disposed in which the milk container is insertable, in that the milk in the milk container is conveyable from the milk container into a mixing apparatus, in a meterable quantity, via a hose line, in which a pump for conveyance of the milk is disposed, in that at least one flavoring agent is suppliable in a metered way into the mixing apparatus by the supply means and is mixable with the milk, and in that the thus obtained mixed beverage reaches, via an outlet, a vessel placeable under this outlet.

With an apparatus of this kind, a flavored milk-based beverage completely fulfilling the high demands as to quality can be produced in a simple way. This apparatus can be manufactured cost effectively; operation is very easy.

Advantageously, the flavoring agents are suppliable to the mixing apparatus in powder form via first supply means or in liquid form via second supply means. Flavoring agents in powder form or liquid flavoring agents can thereby be used, depending upon in which form a respective flavoring agent can best be used.

Advantageously, each first supply means for supply of flavoring agents in powder form has a fillable container for receiving a flavoring agent in powder form, which container is provided with an outlet in which a metering device is installed in the form of a feed screw, which is drivable by motor. The desired quantity of flavoring agent in powder form can thereby be introduced into the mixing apparatus.

Advantageously, each second supply means for supply of flavoring agents in liquid form has a fillable and closable container for receiving a flavoring agent provided in liquid form, which container is provided with a discharge line, into which container air is suppliable via an air pump, by means of which the liquid flavoring agent is pushable through the discharge line into the mixing apparatus. Thus the supply of a liquid flavoring agent to the mixing apparatus can also be achieved simply and in the desired dosage.

In order to be able to dispense from the apparatus a selection of beverages with different flavors, this apparatus is preferably equipped with a plurality of first supply means for supply of flavoring agents in powder form and/or a plurality of second supply means for supply of flavoring agents in liquid form to the mixing apparatus.

Another advantageous embodiment of the invention consists in that a furcation is disposed in the hose line between milk container and pump, rinse water or a cleaning agent is able to be introduced, via a further hose line, into the furcation and into the hose line after the furcation, by means of which the hose line, pump and mixing apparatus are cleanable, and in that one closing valve each is provided in the hose line before the furcation in direction of flow of the milk and in the further hose line before the furcation in direction of flow of the rinse water or of the cleaning agent. By means of this design the apparatus allows itself to be cleaned easily and automatically.

Advantageously, the mixing apparatus is provided with a receptacle into which the flavoring agent in powder form or in liquid form is fillable by hand using a corresponding vessel. Beverages can thereby be produced in an individual way with other flavoring agents, besides the foreseen flavoring agents.

The apparatus is provided with a control unit by means of which pump, closing valve, metering devices, air pump and required measuring means are controllable, whereby the apparatus automatically delivers the desired amount of beverage with the desired flavor upon entering of a command, for instance by push button.

Another advantageous embodiment of the invention consists in a device being disposed in the region of the outlet, by means of which device finely crushed ice is able to be delivered in portions into the vessel positioned under the outlet, controlled via the control unit. An ice-cold, flavored milk-based beverage is thereby obtainable.

A further advantageous embodiment of the invention consists in that a device for dispensing ice cream, in particular soft ice cream, is disposed in the region of the mixing apparatus, by means of which device ice cream is able to be introduced in portions into the mixing apparatus and is able to be mixed with the supplied milk. In this way, a beverage known by the designation "frappé" (milk shake) is additionally able to be produced. The desired flavoring agent can also be introduced into this drink.

Another advantageous embodiment of the invention consists in that a payment system is associated with the apparatus, into which an amount may be entered in the form of cash or other means of payment, after which a beverage is dispensed from the apparatus. This apparatus can thus be used as a beverage vending machine which anyone can operate.

A further advantageous embodiment of the invention consists in its co-operating with a coffee machine, whose outlet is disposed adjacent to the outlet or spout of the apparatus, so that the coffee able to be dispensed from the coffee machine flows into the vessel placed under these outlets. Coffee-based beverages can thereby also be dispensed from this expanded apparatus, in addition to cold milk-based beverages.

Advantageously, a further furcation is provided in the hose line after the pump, so that the milk conveyed by the pump reaches an emulsifying device via the branched-off line, is heated and, if necessary, is frothed up, and is conveyable into the vessel positioned under the spout. Warm milk-based beverages can thereby be dispensed in addition to cold milk-based beverages; with use with a coffee machine, cappuccino and caffè macchiato can also be produced, in addition to simple milk coffee or caffè latte.

In order to bring the milk into the desired hose line, one further blocking valve each is preferably provided into the hose line after the further furcation and into the branched-off line, which blocking valve is controllable via the control unit.

BRIEF DESCRIPTION OF THE DRAWINGS

Embodiments of the present invention will be explained more closely in the following, by way of example, with reference to the attached drawing.

Shown are.

DESCRIPTION OF EXAMPLE EMBODIMENTS

Figure 1:
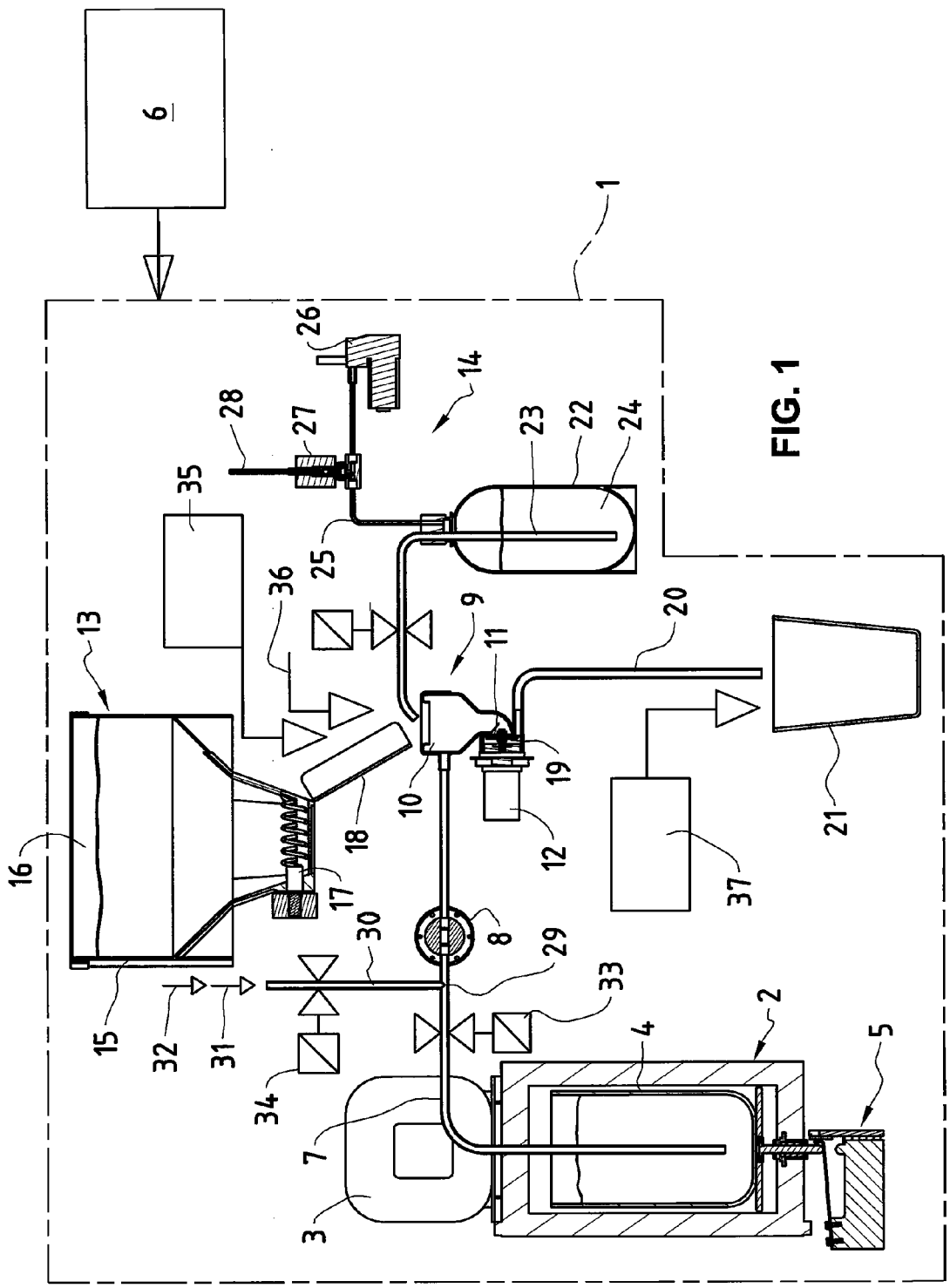
FIG. 1, a diagrammatic representation of an apparatus according to the invention.

As can be seen from the diagrammatic representation according to FIG. 1, a coolable cabinet 2 is disposed in a housing 1, which is represented by a broken line. This coolable cabinet 2 is provided with a cooling unit 3 in a known way. The walls of this cabinet are insulated, and it has a closable door that enables access to the interior. Insertable in this coolable cabinet 2 is a milk container 4. This milk container 4 comes to stand on a weighing system 5 included in the coolable cabinet 2. The filling level of this container can be determined in a known way by weighing the milk container. When the container is nearly empty, a signal can be emitted which is sent to a control unit 6 of the apparatus in a known but not illustrated way, where it is indicated that a new milk container is to be inserted.

Inserted into the milk container is the one end region of a hose line 7, which hose line 7 is connected to a pump 8. This pump 8 can convey milk out of the milk container 4 into a mixing apparatus 9. Mixing apparatuses of this kind are known. Such a mixing apparatus is being offered for sale on the market. This mixing apparatus 9 has a receiving chamber 10, into which the milk conveyed by the pump 8 arrives, the flow rate being measured in a known way and thus the milk quantity per dispensing of a drink being controllable via the control unit 6. Disposed in the lower region of this receiving chamber is a mixing and pumping wheel 11, which is drivable via a motor 12.

A flavoring agent can be loaded into the receiving chamber 10 of the mixing apparatus 9. As can be seen from FIG. 1, first supply means 13 and second supply means 14 can be used for this purpose. Each first supply means is provided with a container 15, in which a flavoring agent 16 in powder form can be filled. The container 15 is designed funnel-shaped at its lower end. Provided at the end of this funnel is a metering device in the form of a feed screw 17, with which the flavoring agent 16 in powder form can be brought onto a chute 18, via which the flavoring agent in powder form arrives in the receiving chamber 10 of the mixing apparatus 9. The metering of the supply of the flavoring agent 16 in powder form into the mixing apparatus 9 takes place in a known way via the control unit 6; for example, a defined amount of flavoring agent in powder form can be dispensed by the feed screw 17 rotating for a preset period of time.

The flavoring agent 16 in powder form arrives simultaneously with the milk in the receiving chamber 10 of the mixing apparatus 9, is stirred in the mixing chamber 19 via the mixing and pumping wheel 11, and through the pumping action reaches an outlet 20 and from there arrives in a vessel 21 placed under this outlet.

If, instead of flavoring agents in powder form, liquid flavoring agents are supposed to be added to the milk, this is possible via the second supply means 14. These second supply means 14 comprise in each case a closable bottle-like container 22, into which a hose line 23 is inserted. This hose line 23 is submerged in the liquid flavoring agent 24, which is filled into the bottle-like container 22. Discharging into the bottle-like container 22 is also an air hose 25, via which compressed air is suppliable into the bottle-like container from an air compressor 26. With the supply of air into the bottle-like container, the liquid flavoring agent 24 is pushed through the hose line 23 into the receiving chamber 10 of the mixing apparatus 9, and is mixed with the supplied milk, as previously described. For control of the suppliable quantity of the liquid flavoring agent 24, a valve 27 can be provided, which is inserted in the air hose 25, and which can be opened and closed in a known way via the control unit 6. For this purpose this valve 27 can be equipped with a vent line 28, via which the pressure in the bottle-like container 22 can be relieved. Of course the air compressor 26, controlled via the control unit 6, can be actuated when the valve 27 is correspondingly opened.

Thus, with this apparatus, cold milk-based beverages can be dispensed which are provided with flavoring agents of the most various kinds that are offered for sale ready-made on the market. This apparatus can be provided with a number of first supply means for flavoring agents in powder form. It can moreover be provided with a number of second supply means 14 for dispensing liquid flavoring agents, depending upon how many and which flavoring agents are supposed to be added to the milk. The control unit 6 can be designed in a known way such that the different beverages can be selected via buttons, whereupon the desired metered amounts are dispensed by the corresponding means.

This apparatus is preferably also equipped with a known cleaning device, as can be seen from FIG. 1. For this purpose, the hose line 7 has a furcation 29 between the milk container 4 and the pump 8, into which furcation a further hose line 30 comes out. Hot or cold rinse water, represented by arrow 31, is suppliable into this further hose line 30 in a known way, whereby the hose line 7, the mixing apparatus 9 and the outlet 20 can be rinsed. A cleaning agent can also be conducted through the further hose line 30, represented by arrow 32, cleaning the corresponding lines and elements. Afterwards subsequent rinsing can take place with water. In order to be able to carry out this rinsing or respectively cleaning procedure, a closing valve 33 is disposed in the hose line 7, while a further closing valve 34 is provided in the further hose line 30.

These closing valves 33 and 34 are correspondingly opened or closed via the control unit 6, depending upon the mode of operation of the apparatus.

As can likewise be seen from FIG. 1, the apparatus can be provided with a device 35 for dispensing ice cream, in particular soft ice cream. Via this device 35, soft ice cream, for example, can be brought into the receiving chamber 10 of the mixing apparatus 9, while at the same time milk is supplied. This soft ice cream and the milk are mixed, as has been described in the foregoing, and are dispensed via the outlet 20 into the vessel 21 positioned underneath. Thus a beverage is obtained known by the name of "frappé" (milk shake). A flavoring agent can also be added to this beverage, for example a fruit flavor, so that a beverage with fruit flavor can be obtained.

As can likewise be seen from FIG. 1, the receptacle 36 of the mixing apparatus 9 can be designed in such a way that a flavoring agent in powder or liquid form is able to be filled by hand, for instance by means of a spoon, represented by arrow 36. This can be of advantage, for example, for testing different flavoring agents and the corresponding drinks.

Furthermore, as can likewise be seen from FIG. 1, a device 37 can be disposed in the region of the outlet 20, which device delivers in a known way finely crushed ice into the vessel 21 positioned under the outlet 20, controlled by the control unit 6.

Figure 2:
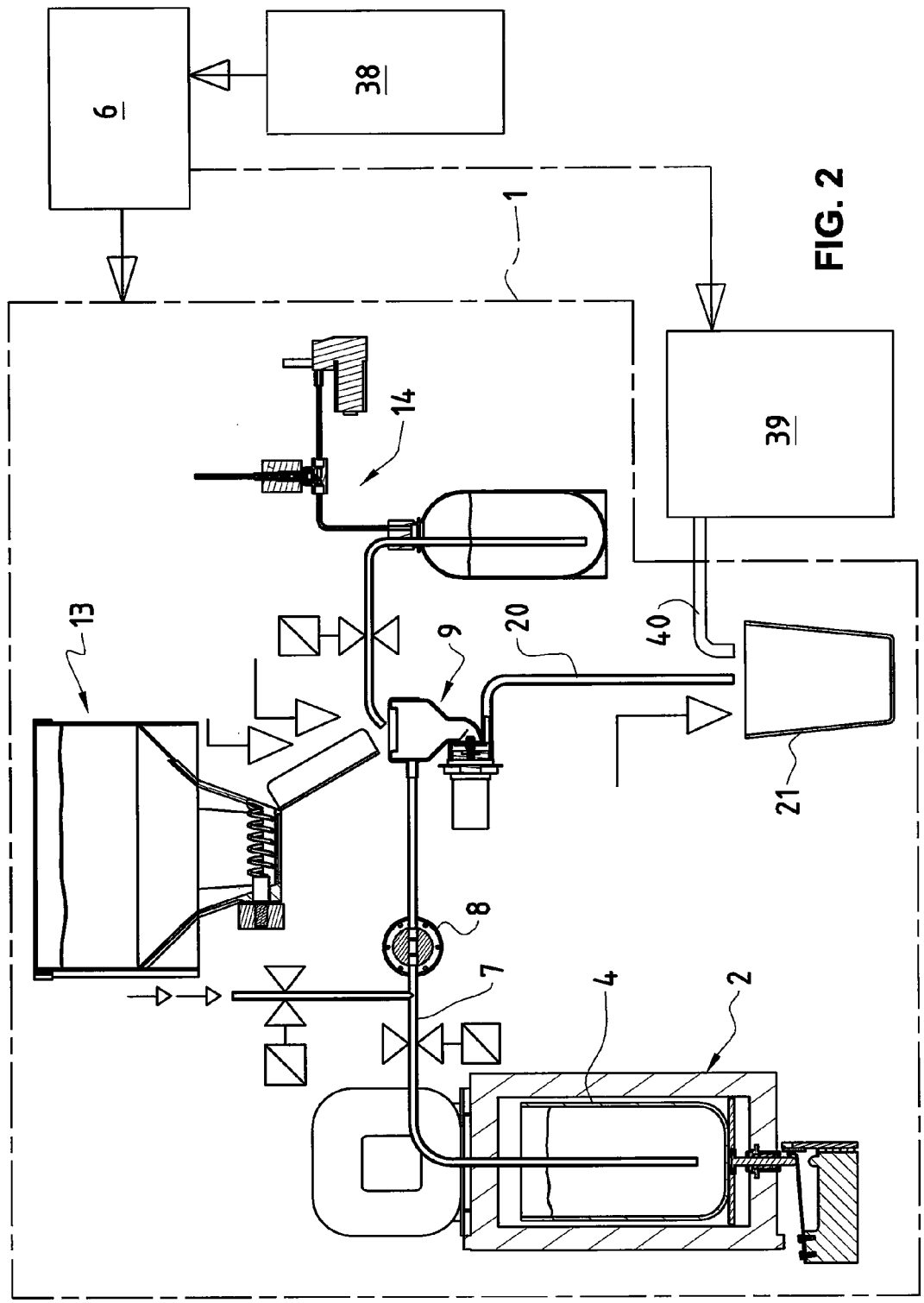
FIG. 2, a diagrammatic representation of the apparatus according to the invention which co-operates with a coffee machine and in which a payment system is disposed.

Shown diagrammatically in FIG. 2 is the same apparatus as in FIG. 1, with housing 1, coolable cabinet 2, milk container 4 insertable in the coolable cabinet, a hose line 7, with pump 8, by means of which the milk is able to be brought out of the milk container 4 into the mixing apparatus 9, first supply means 13 and second supply means 14 for supply of flavoring substance in powder or liquid form, the outlet or spout 20, by means of which the mixed beverage is able to be brought into the vessel 21 disposed under the outlet 20. With this configuration, a payment system 38 is associated with the control unit 6, which payment system is arranged such that an amount in the form of cash or other payment means, for example payment cards, credit cards or debit chips, is entered, whereby a release is effected for dispensing of a beverage, after which a corresponding beverage can be selected via input means (not shown) in the form of buttons in the control unit.

In addition, a coffee machine 39 can be associated with this apparatus according to the invention, which coffee machine is disposed in such a way that the outlet or spout 40 for the coffee-based beverage is disposed adjacent to the outlet or spout 20 for the milk-based beverage, so that for the milk-based beverage as well as for the coffee-based beverage, the vessel 21 may be placed at a single dispensing point. This coffee machine 39 is likewise actuated via the control unit 6, for which purpose additional buttons are provided for the selection of coffee-based beverages.

It is easily conceivable that the apparatus according to the invention for the dispensing of milk-based beverages and the coffee machine are accommodated in one and the same housing.

Figure 3:
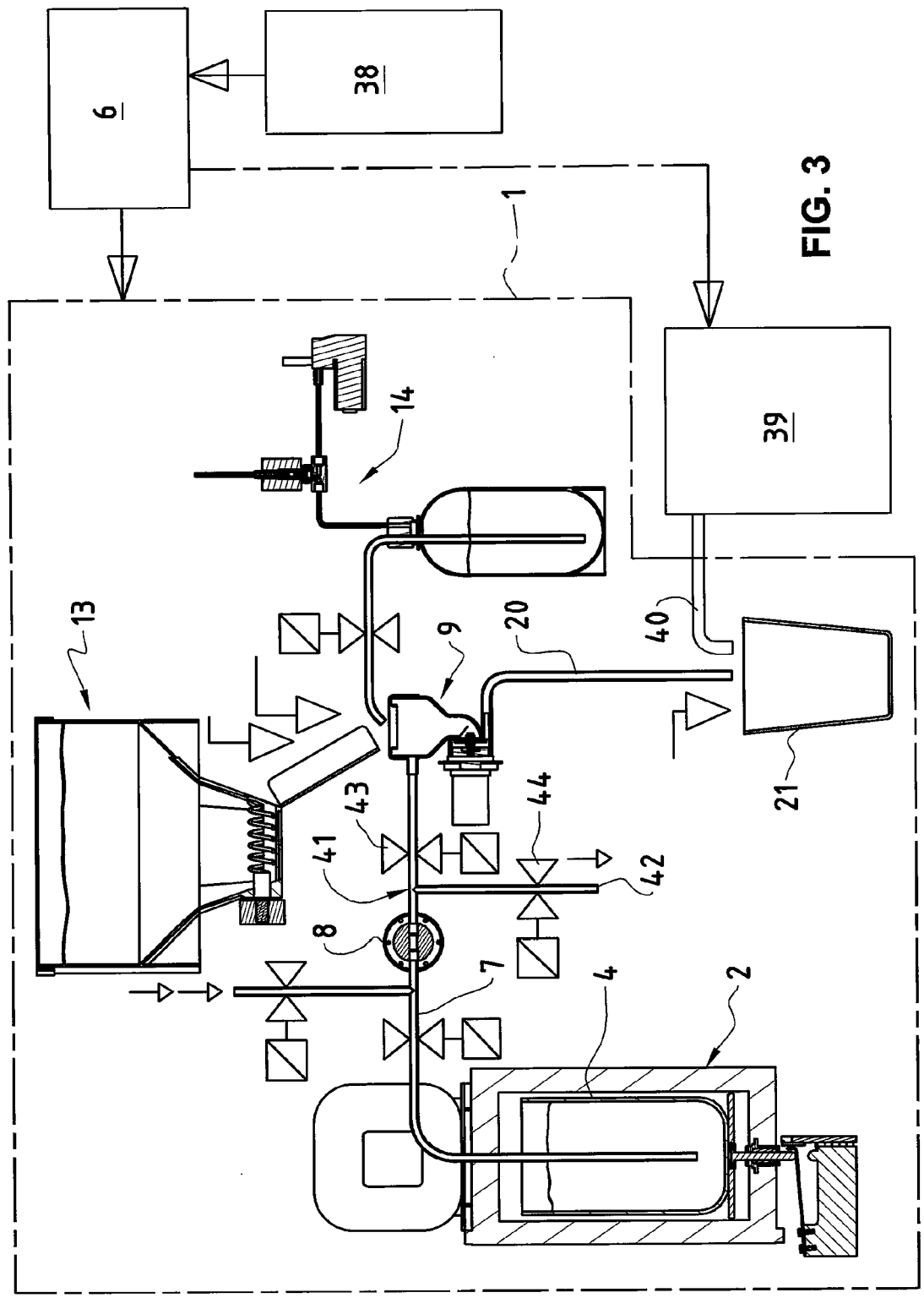
FIG. 3, a diagrammatic representation of the apparatus according to the invention which co-operates with a coffee machine and in which the milk for preparing coffee is able to be delivered from the milk container.

FIG. 3 shows, in a diagrammatic representation, the same apparatus as is visible in FIG. 2, with the coolable cabinet 2, the milk container 4 insertable in the coolable cabinet 2, the hose line 7, via which the pump 8 conveys the milk from the milk container 4 into the mixing apparatus 9, the first supply means 13 and the second supply means 14 for supplying flavoring substance in powder or liquid form into the mixing apparatus 9, the outlet 20, the vessel 21 disposed under the outlet 20, with the coffee machine 39 and the outlet 40 of the coffee machine for dispensing coffee-based beverages. In this configuration, a further furcation 41 is made in the hose line 7 after the pump 8, so that, via this branched-off line 42, the milk conveyed by the pump 8 can be diverted, and namely into a device which will be subsequently described in more detail. A closing valve 43, 44 is provided, in each case after the further furcation 41, for redirecting the milk conveyed by the pump 8 from the hose line 7 into the mixing apparatus 9 or respectively via the branched-off line 42, which valves are able to be opened and closed in a known way (not shown) via the control unit 6. When the milk is supposed to be conveyed into the mixing apparatus 9, the closing valve 43 is opened, the closing valve 44 is closed. When the milk is supposed to be conveyed into the branched-off line 42, the closing valve 43 is closed and the closing valve 44 opened.

Figure 4:
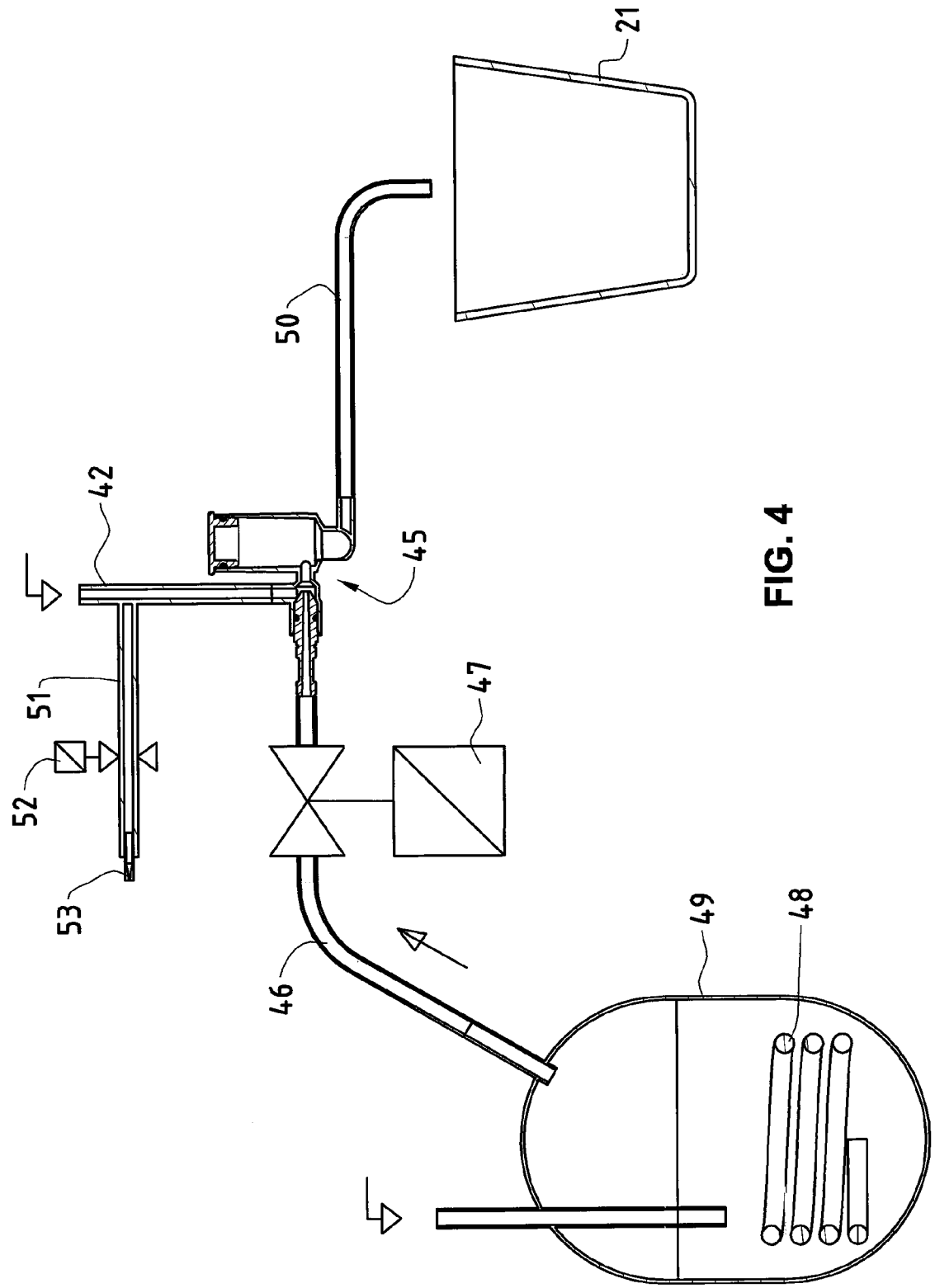
FIG. 4, in a diagrammatic representation, the device for preparing hot and frothed up milk.

As can be seen from FIG. 4, the branched-off line 42 leads into an emulsifying device 45. In this emulsifying device 45 water vapor is conducted through the line 46 and the corresponding closing valve 47, which water vapor is generated in a known way in a boiler 49 provided with a heater 48. The milk conducted through the branched-off line 42 into the emulsifying device 45 is heated therein with steam, which is brought into the emulsifying device 45 via the line 46. The thus heated milk reaches, via the discharge line 50, the vessel 21, which can be placed under this discharge line 50. This discharge line 50 is disposed adjacent to the discharge lines 20 and 40 (FIG. 2 and FIG. 3), so that the milk conducted via this discharge line 50 also ends up in the vessel 21.

Coming out into the branched-off line 42 is another air hose 51, which is also able to be opened and closed via a closing valve 52, which is likewise controllable via the control unit 6 (FIG. 3), a nozzle 53 being disposed at the end of this air hose. The air is then supplied to the milk when the latter is not just supposed to be heated in the emulsifying device 45, but also frothed up, so that frothed up milk is able to flow out of the discharge line 50 for making a cappuccino, for example.

When using a device for preparing hot and frothed up milk, it is advantageous if the apparatus according to the invention for dispensing cold milk-based beverages and the coffee machine with the corresponding attachment for supply of hot and frothed up milk are accommodated in one and the same housing and are controlled centrally via the control unit 6.

Figure 5:
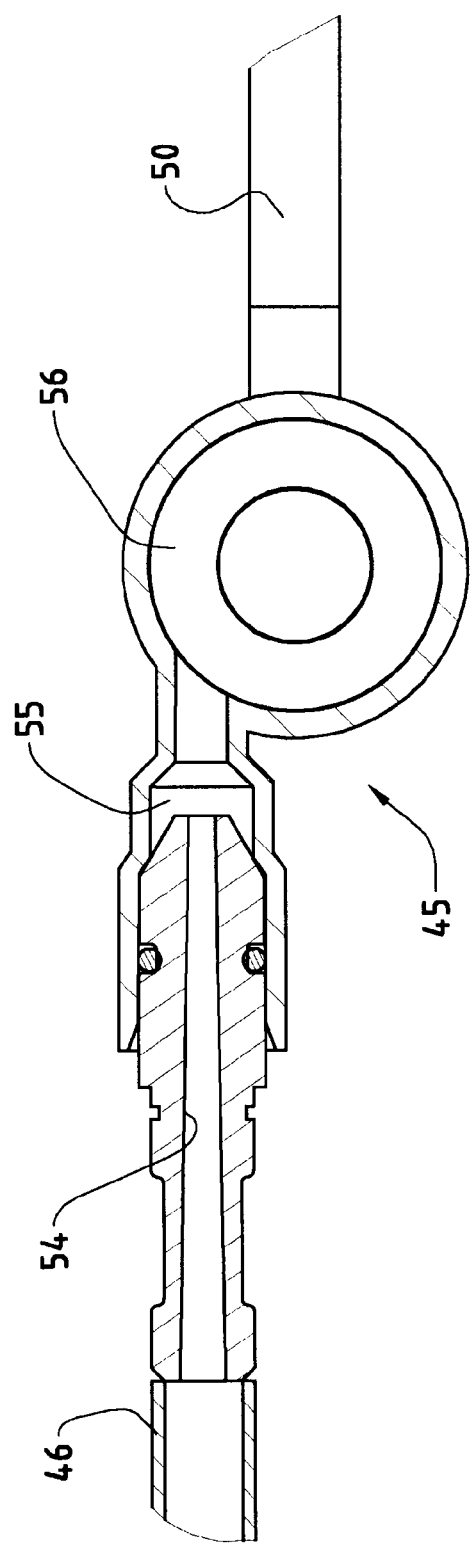
FIG. 5, a sectional representation of the emulsifying device.

FIG. 5 shows in section the construction of a known emulsifying device. Via the line 46 and the nozzle 54, the steam reaches a first chamber 55, in which the milk, and if necessary the air, is suctioned, and ends up in the vortex chamber 56, from where the warm, and if applicable frothed up, milk reaches the discharge line 50.

With the apparatus according to the invention, an appliance is obtained with which the most various kinds of cold milk-based beverages can be dispensed. This apparatus can be expanded in such a way that moreover any type of coffee can be produced with milk and/or frothed up milk, so that a multitude of different beverages can be supplied. Such a machine is suitable in particular for restaurant and catering businesses. It can also be provided as a beverage vending machine or as part of beverage vending machines.

The invention claimed is:

1. An apparatus for dispensing milk-based beverages, comprising a cooled milk container filled with cooled milk, a pump for conveying a first metered quantity of said cooled milk from said milk container, a supplying device for supplying a second metered quantity of at least one flavoring agent from a powder flavoring agent container containing flavoring agent in powder form or from a liquid flavoring agent container containing flavoring agent in liquid form, or from both said powder flavoring agent container containing said flavoring agent in powder form and said liquid flavoring agent container containing said flavoring agent in liquid form, a mixing apparatus to which said cooled milk is conveyed, wherein the mixing apparatus is provided with an open receptacle, a chute extending from said powder flavoring agent container to above said open receptacle through which said flavoring agent in powder form can be supplied to said mixing apparatus, said open receptacle being accessible so that the at least one flavoring agent can be supplied to said mixing apparatus by a spoon, a discharge hose extending from said liquid flavoring agent container to above said open receptacle through which said flavoring agent in liquid form can be supplied to said mixing apparatus, further comprising a housing and a cabinet cooled by a cooling unit, for receiving said cooled milk container, said cabinet being disposed in said housing, whereby said cooled milk container is connected to said mixing apparatus by a first hose line in which said pump for conveying said cooled milk is disposed, whereby said mixing apparatus comprises a mixing and pumping wheel and is connected to an outlet thereby mixing said conveyed cooled milk with said supplied at least one flavoring agent within said mixing apparatus to produce a flavored milk and, at the same time as said mixing, dispensing said flavored milk into a vessel which is placed under said outlet, wherein a furcation is disposed in said first hose line between said milk container and said pump, and a second hose line is connected to said first hose line at said furcation for introducing rinse water and/or a cleaning agent into said first hose line, and two closing valves are provided one of which closing valves is disposed in said first hose line before said furcation in a direction of flow of the milk, and the other of which closing valves is disposed in the second hose line, wherein said pump and/or said mixing apparatus are cleaned by separating said first hose line from said milk container with said closing valve disposed in said first hose line and introducing said rinse water and/or said cleaning agent into said separated first hose line.

2. The apparatus according to claim 1 wherein said powder flavoring agent container has an outlet, in which a feed screw is installed, which is driven by a motor and supplies said mixing device with said second metered quantity of said at least one flavoring agent in powder form.

3. The apparatus according to claim 1 wherein said liquid flavoring agent container is closed and has an interior which is connected to an air pump by an air hose, wherein the at least one flavoring agent in liquid form is pushed to said mixing apparatus through said discharge hose by pumping air into said liquid flavoring agent container by said air pump through said air hose.

4. The apparatus according to claim 1 wherein a plurality of said supplying devices and said containers for supplying a plurality of the at least one flavoring agent in powder form and/or liquid form are connected to said mixing apparatus.

5. The apparatus according to claim 1 wherein a control unit is provided, which is connected to said pump and to said supplying device for controlling said first metered quantity of said milk and said second metered quantity of the at least one flavoring agent.

6. The apparatus according to claim 1 wherein a control unit is provided, which is connected to said pump, said supplying device, and said closing valves for controlling said first metered quantity of said milk, said second metered quantity of the at least one flavoring agent and said cleaning by introducing said rinse water and/or said cleaning agent.

7. The apparatus according to claim 1 wherein a device for delivering portions of finely crushed ice is disposed in the region of said outlet, and said device is connected to a control unit, wherein said device delivers portions of the finely crushed ice into said vessel positioned under said outlet under control of the control unit.

8. The apparatus according to claim 1 wherein a device for dispensing ice cream, in particular soft ice cream, is disposed in the region of the mixing apparatus, such that the ice cream can be introduced in portions into the open receptacle of said mixing apparatus to be mixed with the supplied milk.

9. The apparatus according to claim 1 wherein a payment system is provided, into which an amount may be entered in the form of cash or other means of payment, and which is connected to a control unit for controlling the operation of said apparatus such that said flavored milk is only prepared and dispensed when a predetermined amount of cash or other means of payment is entered into said payment system.

10. The apparatus according to claim 1 wherein a furcation is provided in said first hose line after said pump, and a branched-off line runs from said furcation to an emulsifying device, which dispenses emulsified milk into said vessel by means of a discharge line.

11. The apparatus according to claim 10 wherein two blocking valves are provided, one of which said blocking valves is disposed in said first hose line after said furcation and the other of which said blocking valves is disposed in said branched-off line, which blocking valves are connected to a control unit.

12. A beverage system comprising a coffee machine with a first outlet and an apparatus for dispensing milk-based beverages according to claim 1 with said outlet being a second outlet, whereby said first outlet is disposed adjacent to said second outlet, so that coffee and/or a milk-based beverage can be dispensed into the vessel placed under said first and second outlets.

* * * * *